(12) United States Patent
Kirn

(10) Patent No.: US 6,989,657 B2
(45) Date of Patent: Jan. 24, 2006

(54) METHOD OF DETECTING SWITCHING POWER SUPPLY OUTPUT CURRENT

(75) Inventor: Larry Kirn, East Lansing, MI (US)

(73) Assignee: JAM Technologies, LLC, Boston, MA (US)

( * ) Notice: Subject to any disclaimer, the term of this patent is extended or adjusted under 35 U.S.C. 154(b) by 0 days.

(21) Appl. No.: 10/769,952

(22) Filed: Feb. 2, 2004

(65) Prior Publication Data

US 2004/0164719 A1    Aug. 26, 2004

Related U.S. Application Data

(60) Provisional application No. 60/444,568, filed on Feb. 3, 2003.

(51) Int. Cl.
*G05F 1/652* (2006.01)
*G05F 1/656* (2006.01)

(52) U.S. Cl. .................. 323/222; 323/284; 323/351

(58) Field of Classification Search ............... 323/222, 323/282, 284, 285, 286, 351
See application file for complete search history.

(56) References Cited

U.S. PATENT DOCUMENTS 5,367,247 A * 11/1994 Blocher et al. ............. 323/222
5,696,439 A * 12/1997 Presti et al. ................ 323/283
6,194,882 B1 * 2/2001 Mirow et al. ............... 323/282
6,690,144 B1 * 2/2004 DeNicholas et al. ........ 323/222
6,778,416 B2 * 8/2004 Bruno ......................... 363/89

* cited by examiner

Primary Examiner—Bao Q. Vu
(74) Attorney, Agent, or Firm—Gifford, Krass, Groh, Sprinkle, Anderson & Citkowski, PC

(57) ABSTRACT

A method and apparatus for detecting output current in switching power supplies forgoes the need for any resistor or other components in series with the load. A method according to the invention includes the steps of inferring the peak current through the inductor as a function of input voltage and inductor charge time, and deriving the current available to the load based upon the flyback voltage during discharge of the inductor. Although a disclosed example is based upon a buck/boost topology, other converter topologies are anticipated. In terms of apparatus, in a switching power supply of the type wherein a switching device is used to charge an inductor that discharges to a load, the invention provides devices arranged for detecting output current without the need for a resistor or other component in series with the load. In the preferred embodiment, these devices include electrical components operative to generate a signal indicative of peak inductor current, and a switch for switching the signal to provide a waveform, the integral of which is proportional to peak inductor current multiplied by the duty cycle of the discharge of the inductor. Circuitry is further used for comparing the waveform to a fixed reference so as to output a signal indicative of load current.

5 Claims, 2 Drawing Sheets

METHOD OF DETECTING SWITCHING POWER SUPPLY OUTPUT CURRENT

REFERENCE TO RELATED APPLICATION

This application claims priority from U.S. Provisional Patent Application Ser. No. 60/444,568, filed Feb. 3, 2003, the content of which is incorporated herein by reference.

FIELD OF THE INVENTION

This invention relates generally to switching power supplies and, in particular, to a method of detecting output current in such supplies which uses fewer components.

BACKGROUND OF THE INVENTION

Switching power supplies employing inductive components have been in use for some time. Although most applications require constant output voltage (usually implemented through voltage feedback), some applications require a constant output current.

Standard practice for constant current outputs involves adding a resistor in series with the load to convert the output current into a voltage which can then be used as feedback. This approach, however, imposes a tradeoff between series resistor loss and feedback voltage magnitude, or dynamic range. A need exists for a method of detecting output current in switching power supplies which uses no series components.

SUMMARY OF THE INVENTION

This invention resides in a method and apparatus for detecting output current in switching power supplies without the need for any resistor or other components in series with the load. In broad and general terms, the technique derives the peak inductor current of a switching converter through input voltage and inductor charge time, and calculates the current integral of that peak current available to the load through the use of the flyback voltage during discharge of the inductor.

A method according to the invention more particularly includes the steps of inferring the peak current through the inductor as a function of input voltage and inductor charge time, and deriving the current available to the load based upon the flyback voltage during discharge of the inductor. Although a disclosed example is based upon a buck/boost topology, other converter topologies are anticipated.

In terms of apparatus, in a switching power supply of the type wherein a switching device is used to charge an inductor that discharges to a load, the invention provides devices arranged for detecting output current without the need for a resistor or other component in series with the load. In the preferred embodiment, these devices include electrical components operative to generate a signal indicative of peak inductor current, and a switch for switching the signal to provide a waveform, the integral of which is proportional to peak inductor current multiplied by the duty cycle of the discharge of the inductor. Circuitry is further used for comparing the waveform to a fixed reference so as to output a signal indicative of load current.

DETAILED DESCRIPTION OF THE INVENTION

Figure 1:
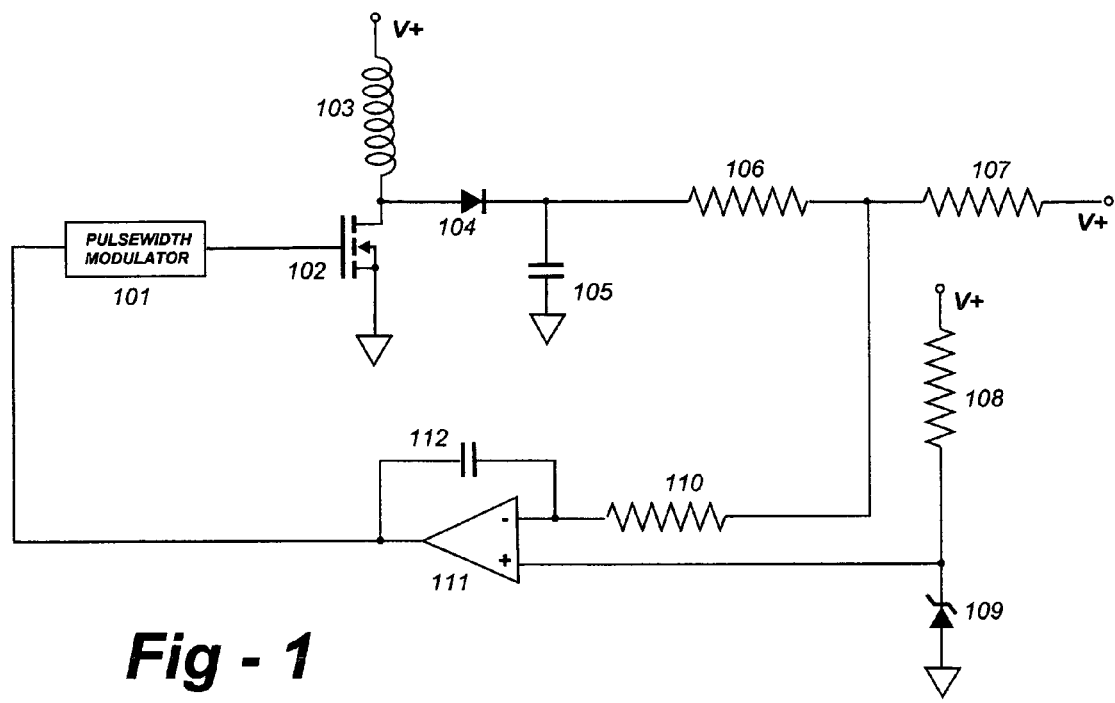
FIG. 1 is a schematic diagram of a typical, fixed-frequency buck/boost converter known in the art.

Turning now to the drawings, FIG. 1 is a schematic diagram of a typical, fixed-frequency buck/boost converter known in the art. Pulsewidth modulator 101 outputs a duty cycle to switching device 103 proportional to its control voltage input. Switching device 103 alternately charges inductor 103 and allows its discharge through diode 104 to load 106. Capacitor 105 serves to filter the resultant voltage supplied to load 106. Resistor 107 converts the resultant current in load 106 to a voltage useable as feedback. The feedback voltage is supplied to an integrator comprised of resistor 110, capacitor 112, and operational amplifier 111, wherein it is compared to a fixed voltage reference comprised of resistor 108 and zener diode 109. The integrator then provides the control voltage for pulsewidth modulator 101, closing the loop.

Figure 2:
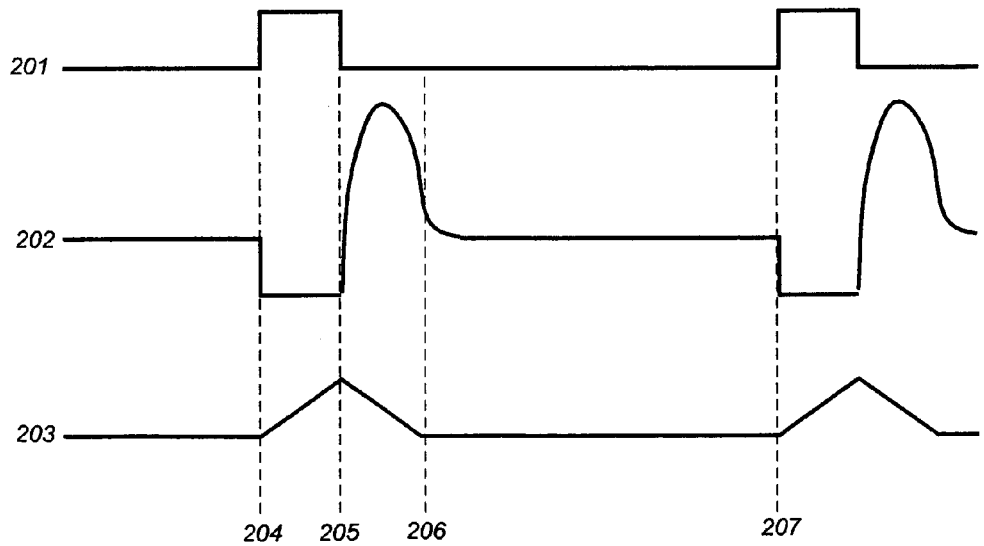
FIG. 2 shows operational voltage and current waveforms of the circuit of FIG. 1.

Referring now to FIG. 2, trace 201 shows the switching output of pulsewidth modulator 101 which drives switching device 102, trace 202 shows resultant inductor voltage at the anode of diode 104, and trace 203 shows resultant current in inductor 103. At time marker 204, switching device 102 is activated, causing a resultant linear increase in inductor 103 current, shown in trace 203. At time marker 205, switching device 102 is deactivated, which results in inductor 103 flyback voltage seen in trace 202, and a linear decrease in inductor 103 current seen in trace 203. At time marker 206, the energy of inductor 103 is depleted, resulting in zero current and zero voltage differential in inductor 103, as seen in traces 202 and 203, respectively. At time marker 207, the entire cycle repeats.

Note that peak current in inductor 103 is a linear function of both supply voltage and switching device 102 assertion time. Note as well that this peak current linearly decreases to depletion during inductor 103 discharge. The average current delivered to load 106 is therefore half the peak inductor 103 current multiplied by the ratio of discharge time to total cycle period. Expressed mathematically, average output current can be expressed as $((V^*(T205-T204))/2)^*((T206-T205)/T207-T205))$, where V denotes supply voltage, and Tnnn indicates absolute time at the indicated FIG. 2 marker. Note that depletion of inductor 103 current at time marker 206 is clearly indicated by inductor 103 voltage in trace 202. Discharge time of inductor 103 can thereby be monitored.

Figure 3:
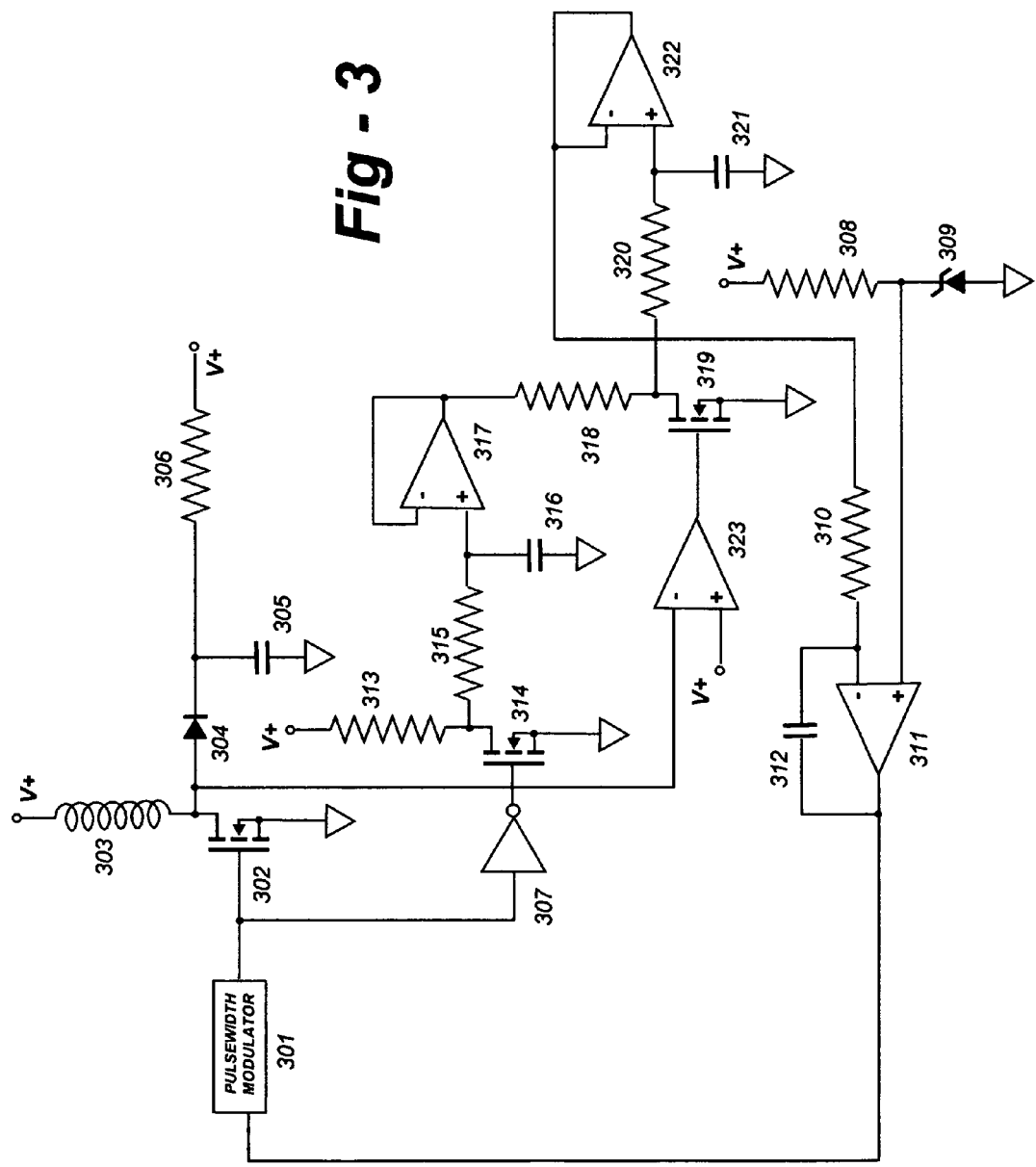
FIG. 3 is a schematic of a preferred embodiment of the current invention.

Referring now to FIG. 3, note that the circuitry depicted deviates from that of FIG. 1 by the omission of resistor 107, and the additional circuitry driving the integrator formed by resistor 110, capacitor 112, and operational amplifier 111 of FIG. 1. Components 301–306, and 308–312 of FIG. 3 thus operate similarly to their counterparts of FIG. 1, but with the lack of current sense resistor 107 and feedback voltage derivation.

Inverter 307 de-asserts switching device 314 whenever switching 302 is charging inductor 303, and asserts switching device 314 otherwise. In conjunction with resistor 313, switching device 314 then outputs a switched waveform, the integral of which is the supply voltage times the duty cycle of inductor 303 charge time. This switched waveform, being directly proportional to peak inductor charge current, is filtered by resistor 315 and capacitor 316, and buffered by voltage follower 317.

Voltage follower 317 thus outputs a filtered voltage indicative of peak inductor 303 current. This filtered voltage is then switched through resistor 318 by switching device 319 under control of comparator 323. Connected as shown, comparator 323 yields a low-switched output whenever the output of inductor 303 (at the anode of diode 304) exceeds the incoming supply voltage, and yields a high switched output otherwise. Controlled in this fashion, switching device 319 and resistor 318 then output a switched waveform, the integral of which is directly proportional to inductor 303 peak current multiplied by the duty cycle of inductor 303 discharge.

After filtering and buffering by resistor 320, capacitor 321, and voltage follower 322, this voltage, being directly indicative of output load current, is supplied to the integrator formed by resistor 310, capacitor 312, and operational amplifier 311, for comparison with the fixed reference voltage supplied by resistor 308 and zener diode 309. By the above method, power supply loop closure on output current is affected without use of any load series resistance.

Although use is shown in a buck/boost topology, it will be apparent to those of skill in the art that other converter topologies are anticipated.

I claim:

1. In a switching power supply of the type wherein a switching device is used to charge an inductor that discharges to a load, a method of detecting output current without the need for a resistor or other component in series with the load, the method comprising the steps of:
   inferring the peak current through the inductor as a function of input voltage and inductor charge time; and
   deriving the current available to the load based upon the flyback voltage during discharge of the inductor.

2. The method of claim 1, wherein inductor forms part of a buck/boost topology.

3. In a switching power supply of the type wherein a switching device is used to charge an inductor that discharges to a load, apparatus for detecting output current without the need for a resistor or other component in series with the load, comprising:
   electrical components operative to generate a signal indicative of peak inductor current;
   a switch for switching the signal to provide a waveform, the integral of which is proportional to peak inductor current multiplied by the duty cycle of the discharge of the inductor; and
   circuitry for comparing the waveform to a fixed reference so as to output a signal indicative of load current.

4. Apparatus for detecting output current of switching power supply without the need for a resistor or other component in series with the load, comprising:
   a switching device used to charge an inductor that discharges to a load in accordance with an input signal;
   electrical components operative to generate a signal indicative of peak inductor current;
   a switch for switching the signal to provide a waveform, the integral of which is proportional to peak inductor current multiplied by the duty cycle of the discharge of the inductor; and
   circuitry for comparing the waveform to a fixed reference so as to output a signal indicative of load current.

5. The apparatus of claim 4, wherein the switching device and inductor form part of a buck/boost topology.

* * * * *